Dec. 15, 1970 W. A. ALLEN Re. 27,001
FORKLIFT ELEVATING AND BIN-TIPPING MECHANISM
Original Filed Jan. 17, 1966 2 Sheets-Sheet 1
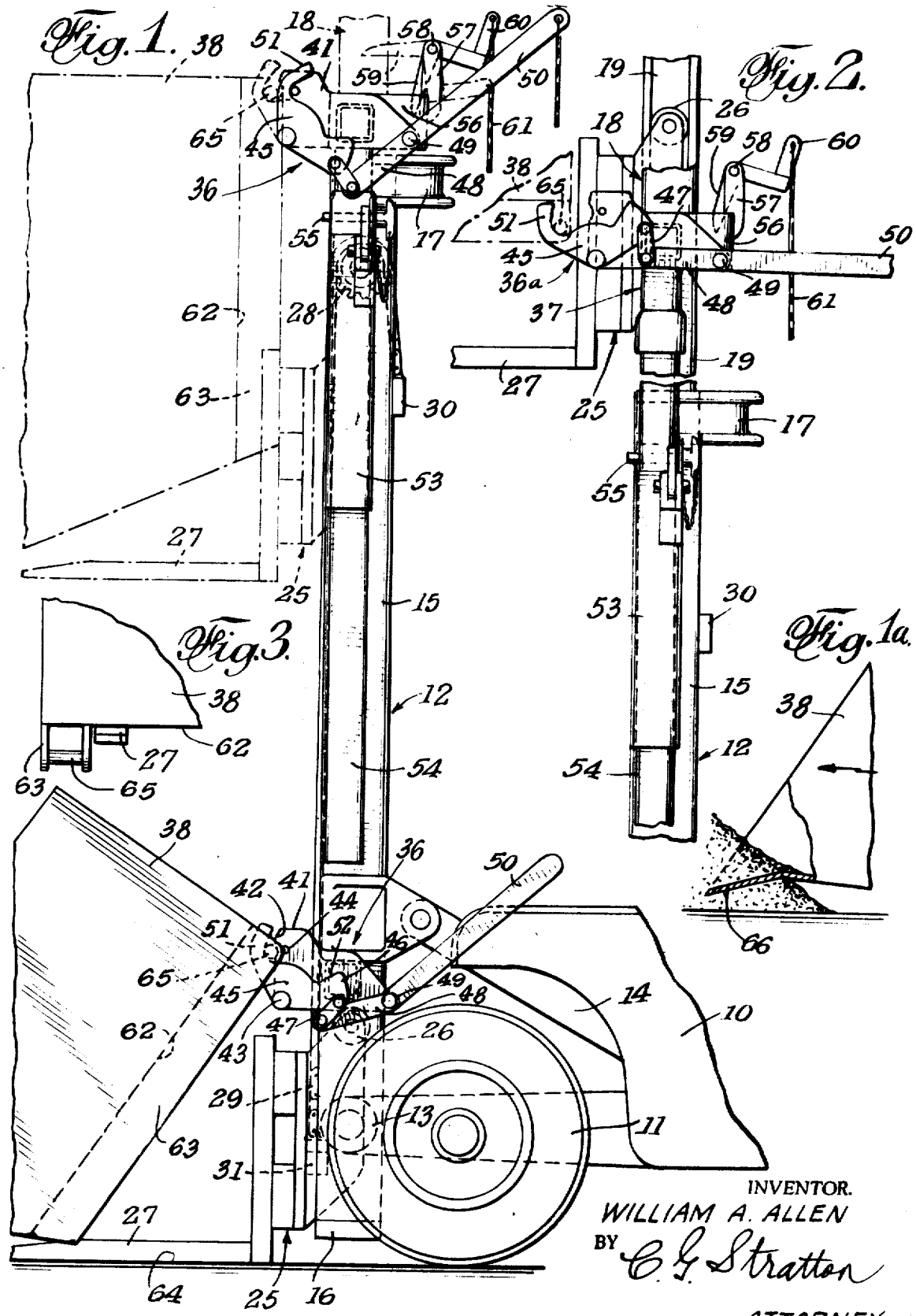
INVENTOR.
WILLIAM A. ALLEN
BY C. G. Stratton
ATTORNEY FORKLIFT ELEVATING AND BIN-TIPPING MECHANISM
Original Filed Jan. 17, 1966 2 Sheets-Sheet 2
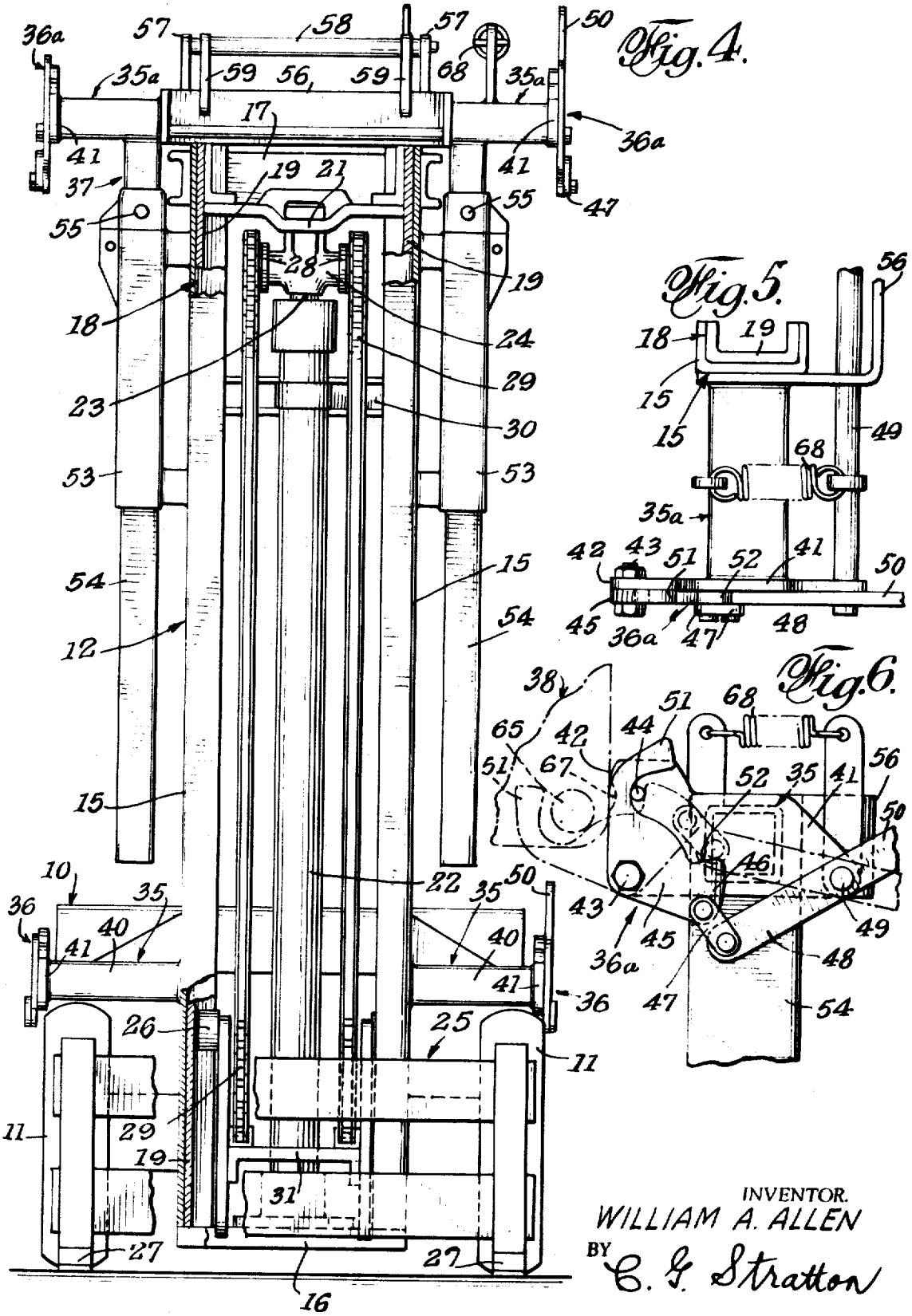
INVENTOR.
WILLIAM A. ALLEN
BY C. G. Stratton
ATTORNEY United States Patent Office Re. 27,001
Reissued Dec. 15, 1970

27,001
FORKLIFT ELEVATING AND BIN-TIPPING MECHANISM

William A. Allen, San Bernardino, Calif., assignor to Jarke Corporation, a corporation of Illinois Original No. 3,358,862, dated Dec. 19, 1967, Ser. No. 520,958, Jan. 17, 1966. Application for reissue Dec. 31, 1968, Ser. No. 794,831
Int. Cl. B65b *69/00*
U.S. Cl. 214—317 6 Claims

Matter enclosed in heavy brackets [ ] appears in the original patent but forms no part of this reissue specification; matter printed in italics indicates the additions made by reissue.

ABSTRACT OF THE DISCLOSURE

This invention includes in a forklift truck construction a vertical mast comprising a pair of spaced vertical inwardly facing channels constituting guides for the vertical movement of a slide, the slide mounting a carriage provided with forwardly directed lift forks. The upper end of the vertical mast is provided with a vertical extension, this extension including a pair of spaced depending tubes which are telescopically received in tubular guides mounted at each side of the mast, there being provision for locking the depending tubes in the tubular guides. Both the vertically extensible upper end portion of the vertical mast and the main mast structure are provided with a pair of vertically spaced manually actuated hook-provided arms, whereby the vertical extensible upper portion of the mast when adjusted will locate the hook-provided arms at predetermined vertical positions. The vertical extensible upper end portion of the vertical mast includes movable means which is shiftable to a position in the path of travel of the carriage so that movement of the carriage will move the vertical extensible upper end portion of the mast relative to the guide frames. The hook-provided arms include hook portions which are shiftable to a position rearwardly clear of the forward face of the carriage or movable to a projected position with the hooks forward of the carriage face in the path of travel of a container, the container being provided with aligned pivot pins at its lower rear corners adapted for engagement with the hooks. By shifting the fork with respect to the container when positioned on the hook, the container may be swung on its pivots for discharge of the material contained therein.

This invention relates to mechanism, embodied in a forklift truck, for tiltably mounting one or more bins or containers, one at a lower position and the other at an elevated position, the forks of such truck constituting both the means for lifting the containers and for releasing them to gravitationally tip to dumping positions. The present invention is an improvement of the Forklift Dumping Means disclosed in my pending application, Ser. No. 443,483, filed Mar. 29, 1965.

An object of the present invention is to provide mechanisms that are applied to both a lower and an elevated portion of the mast of a forklift truck, for engaging a container at each said mast portion by elevating said containers by means of the forks of said truck to positions where the same will become pivotally connected to said mechanisms and will tilt on said connections upon lowering of said forks to dump their contents, such dual arrangement enabling a single forklift truck to move and tip two bins or containers to provide a flexible operation for filling, moving, and discharging or dumping material in many ways.

Another object of the invention is to provide mechanisms, as above characterized, in which the elevated mechanisms may be raised and lowered, as desired, to vary the vertical spacing between the lower and elevated container-engaging mechanisms.

A further object of the invention is to provide a container-engaging mechanism on the lower portion of the mast of a forklift truck in position to cooperate with the forks or tines of said truck to manipulate a container in the manner of a scoop, and a second container-engaging mechanism on an elevated portion of said mast and which is adapted for connection to the scoop container when the latter is elevated by means of the forks, the container thus elevated being adapted for release to tip and discharge its contents upon lowering of said forks.

This invention also has for its objects to provide such means that are positive in operation, convenient in use, easily installed in a working position and easily disconnected therefrom, economical of manufacture, relatively simple, and of general superiority and serviceability.

The above objects of the invention are realized in a construction that has basis on a forklift truck, the mast of said truck being provided with lower and elevated pairs of normally retracted arms that are provided with hooks that, when the arms are moved by an operator to project said hooks, the same are positioned to engage pivot pins on the lower rear corners of a bin or container. The forks or tines of the forklift truck raise and lower the bins to bring the pins thereof in position to engage the hooks so said bins, upon lowering of the forks, may tilt forwardly so its front edge may dig into a pile of material their contents or to assume a scoop position.

When a bin, formed as a scoop, is pivotally connected to the lower pair of hook-provided arms and the forks are lowered to the ground, said bin gravitationally tips forwardly so its front edge may dig into a pile of material or scoop up material strewed in its path as the truck is advanced. The forks are then used to raise the bin to level, toting position, raised by said forks into engagement with the elevated pair of hook-provided arms to become pivotally engaged therewith, so the contents of the bin may be discharged at said elevated position as the forks are lowered. Thus, a single bin, moving between the vertically spaced pairs of hook-provided arms, may convey material under the power of the truck from one position to another. The material may also be lowered by a reverse action from the one described.

Depending on the manner of manipulating the movement of the forks, the two sets of arms, as well as the truck itself, an elevated bin may transfer material to a bin therebelow and the latter bin then picked up by the forks to be moved by the truck to a place where the contents thereof may be dumped.

So the vertical range of operation of the machine may be increased, the elevated pair of hook-provided arms may be raised by the extensible fork-carrying component of the mast.

The invention also comprises novel details of construction and novel combinations and arrangements of parts, which will more fully appear in the course of the following description and which is based on the accompanying drawings. However, said drawings merely show, and the following description merely describes, one embodiment of the present invention, which is given by way of illustration or example only.

In the drawings, like reference characters designate similar parts in the several views.

FIG. 1 is a fragmentary side elevational view of a forklift truck provided with forklift elevating and bin-tipping mechanism according to the present invention.

FIG. 1a is a broken side view showing a bin formed as a scoop and in material-scooping position.

FIG. 2 is a broken side elevational view of the mechanism of FIG. 1, shown in a vertically extended condition.

FIG. 3 is a fragmentary detail view of one rear corner of a bin or container.

FIG. 4 is a partly broken front elevational view as seen from the front or left side of FIG. 1.

FIG. 5 is a broken top view of the upper right hand portion of FIG. 1.

FIG. 6 is a side view of the portion shown in FIG. 5, said view being an enlargement of what is shown in the upper part of FIG. 1.

The forklift truck that is illustrated is generally typical. The same is shown with a chassis 10, two of its support wheels 11, and a mast 12 at the front of the chassis and connected thereto by a pivot 13. Said mast is forwardly movable on said pivot by means of a link 14. It will be understood that said chassis 10 is provided with a prime mover by which the wheels thereof are driven and with power means to actuate the link 14.

The mast 12 typically comprises a rectangular frame that is comprised of vertical channels 15 connected at the bottom by a crosspiece 16 and at the top by a cross bracket 17, a lift frame 18 that comprises channels 19 guided in the channel 15, a bottom cross-bar (not shown) connecting the lower ends of channels 19, and a cross bracket 21 connecting the upper ends of said channels 19.

The lift frame 18 is shown as raised and lowered by hydraulic means which, in this case, comprises a vertical hydraulic cylinder 22 mounted with its foot on the crosspiece 16, a piston 23 movable in said cylinder and connected by a cross-head 24 to the bracket 21, extension of said piston, thereby raising the lift frame 18 at a one-to-one movement ratio with the piston 23.

A carriage 25 is guided by rollers 26 to move vertically in the channel 19, said carriage being provided with typical transversely spaced and forwardly extending forks or tines 27. The mentioned cross-head 24, on opposite sides of the axis or center of the hydraulic means, mounts idler sprocket wheels 28, chains 29 being trained over said wheels, and connected at one end to a cross-bar 30 affixed to the mast 12 and at the other to a cross-bar 31 that is part of the carriage 25. Since the cross-bar 30 is fixed against vertical movement, extension of the lift frame 18 by the hydraulic means will cause the carriage 25 to be raised at a two-to-one ratio with the lift frame. Thus, the forks 27 move upwardly (also downwardly) twice the distance of movement of the lift frame.

The above description of the forklift is intended as exemplary of forklifts generally, the same constituting the environment for the present elevating and bin-tipping mechanism. Said mechanism comprises, generally, a pair of oppositely arranged brackets 35 affixed to the channels 15 adjacent their lower ends, manually actuated hook means 36 mounted on the ends of said brackets 35, an extension frame 37 mounted on the mast 12 adapted to be raised by the lift frame 19 to an adjusted elevated position, oppositely arranged brackets 35a on the extension frame 19, similar to the brackets 35, manually actuated hook means 36a on the ends of the brackets 35a, said hook means 36 and 36a being arranged outwardly beyond the opposite side of the carriage 25, and two containers or bins 38 engageable by the forks 27 to be lifted thereby and by the hook means to be releasably pivotally engaged to tip forwardly when released from beneath by the forks 27.

The brackets 35 are shown as square tubes 40 welded to the outer sides of the channels 15, and a plate 41 welded to the end of each said tube. Said walls are parallel and have front edges 42 that extend forwardly from the front faces of the channels 15. Said walls are provided with transversely aligned pivots 43 and with stop pins 44, both adjacent said edges 42.

The manually actuated hook means 36 are alike, comprising arms 45 that are carried on the pivots 43 to swing in vertical planes on the outer sides of the plates 41, each said arm having an operating end 46 that, by means of a link 47, is connected to an operating arm 48, pivot shaft 49 extending between the plates 41. Depression of the ends 50 of operating arms 48, causes the arms 45 to swing in a counter-clockwise direction, each of the means 36 being viewed from the side.

Each said arm 45 is provided with a hook end 51 at the end thereof opposite to the operating end 46 and with an abutment edge 52 which, together with the hook end 51, constitutes arcuately spaced limiting stops on opposite sides of the stop pin 44 and cooperates with said pin to stop said arm with its hook end 51 retracted, as in the full line position of FIG. 6, or retracted, as in the dot-dash line position of said view, as moved by the arm 48.

The above-described hook means 36, while described as carried by the bracket 35, will serve to describe the hook means 36a at the upper end of the mast and which are carried by the bracket 35a. The arm 48 of the means 36 is actuated by an operator on the chassis 10, and the arm 48 of the means 36 is actuated by a chain pulled by said operator.

The extension frame 37 is carried by guide tubes 53 welded onto the sides of the mast channels 15 and extending in parallelism to said channels. Said frame is provided with tubes 54 that are fixedly held in said tubes 53 by locking dogs 55 which, when retracted, enable the frame to move vertically in the guide tubes 53.

The brackets 35a of said frame 37 are connected by a member 56 which, by means of upstanding lugs 57, supports a rock-shaft 58 on which is mounted a pivoted arm 59 that is in normally retracted position, as in FIG. 2. When vertical extension of frame 27 is desired, the locking dogs 55 are first retracted or removed. Then, the lever end 60 is pulled by means of the chain 61 to raise the arm 59 to the dot-dash line position of FIG. 1, the end 60 of said arm 59 abutting the member 56 to limit said position. Since said arms 59 are now in the path of movement of the channels 19 of the lift frame 18, lifting of said frame by hydraulic extension of the piston 23 will cause the channels 19 to raise frame 37. At the desired height of the means 36a of the frame 37, the latter is re-locked to the tubes 53 and becomes a rigid upper extension of the mast 12.

Each container or bin 38, regardless of its general form, comprises a receptacle that has a bottom 62 that is adapted to be supported on the lift forks 27. The sides of said bins may be extended as extension walls 63 which space the bin bottoms above a supporting surface, as the surface 64. Said wall extensions, at the rearward ends thereof, fixedly mount pivot pins 65 which are aligned and transversely spaced according to the transverse spacing of the hook ends 51 of the means 36 and 36a. A scoop or material collecting end 66 may be provided on one of the bins, as shown in FIG. 1a.

OPERATION

With a bin 38 supported by the lower edges of the wall extensions 63 and the forks 27 extending between the pins 65, at opposite sides and beneath the bottom 62, the rear of the bin being engaged with the front face of the carriage 25, vertical extension of the lift frame 18 will cause said forks to lift said bin. With the lower arms 45 disposed with their hook ends 51 retracted to be at least flush with the plate edges 42, the bin can be moved upwardly until the pivot pins 65 at the rear lower corners of the bin are above the retracted hook ends. Then, if it is desired to connect said bin with the mast 15, the arms 45 are manipulated by the lower arm 48 to project the hook ends 51 to the dot-dash line position of FIG. 6. Upon lowering of the forks 27, the pins 65 encounter the arms 45 inward of their hook ends 51. As the lowering movement of the forks is continued, said pins 65 engage the hook ends 51, thereby hanging the bins 38 thereon, the same tilting forwardly by gravity as the forks continue their downward movement. It will be seen that the contents of the bin, if any, will be dumped by such operation, or, if the bin is empty and is provided with a scoop end 66, as in FIG. 1a, said end may be allowed to rest upon the ground so it may strew, scatter or collect material on the ground, as the forklift truck is moved over the ground, or said end 66 may be retained in any suitable raised position by the forks 27 so that a pile of material may be cut into by said scoop end 66 and collected in the bin. The latter may then be raised by means of the forks 27 and the truck moved to a place where said material may be discharged by allowing the bin to tilt, as above described.

Whether or not the extension frame 37 is in raised or lowered position, or if the construction does not include such a frame but has fixedly mounted hook means 36a on the upper portion of the mast in the same way that the hook means 36 is mounted, the vertical movement of the bin on the forks 27 may be continued past the means 36 and be engaged by the means 36a in the same manner. Such a bin is shown in FIG. 1 in dot-dash lines in its depending or dumping position for discharging material into a bin disposed therebeneath. Said elevated bin may be tilted upwardly to receive material and allowed to gravitationally tilt downwardly merely by raising and lowering the forks 27.

In order that the hook ends 51 retain the pivot pins 65 against accidental detachment, the arms 45 are retracted to the position shown in the lower part of FIG. 1, said hook ends drawing the pins 65 inwardly into shallow recesses 67 in the edges 42 of the plates 41, the hook ends and recesses combining to hold the pins 65 captive until released by projecting of the arms 45, as described.

Springs 68 bias the shafts 49 in a direction to cause the mentioned retraction of the arms 45.

While the foregoing has illustrated and described what is now contemplated to be the best mode of carrying out the invention, the construction is, of course, subject to modification without departing from the spirit and scope of the invention. Therefore, itis not desired to restrict the invention to the particular form of construction illustrated and described, but to cover all modifications that may fall within the scope of the appended claims.

Having thus described this invention, what is claimed and desired to be secured by Letters Patent is:

1. In a forklift truck having a vertical mast that constitutes a guide for vertical movement of a slide mounting a carriage provided with forwardly directed lift forks:

(a) an extension frame including depending tubes telescopically received in guide tubes fixed to the outer side of said vertical mast, (b) means for locking said telescopic tubes in adjusted position, (c) means carried by the extension frame and movable into the path of movement of said [carriage] *slide* for engagement by said [carriage] *slide* for moving the extension frame vertically with respect to said mast, (d) [two] *a* pair[s] of [vertically] *laterally* spaced [manually actuated] hook-provided arms, [one] *said* pair of hook-provided arms being carried by the extension frame [and the other pair by said mast], the arms of [each] *said* pair being located on opposite sides of the mast, the arms being movable between retracted positions with the hooks thereof rearwardly clear of the forward face of said carriage, and projected positions with the hooks forward of said carriage face, and (e) a container having aligned pivot [pins] *means* at the lower rear [corners] *edge* adapted to be supported on the lift forks of the carriage with said pivot [pins] *means* in the path of the projected hooks [of either pair thereof, selectively,] during lowering movement of the carriage and the container supported on the lift forks thereof, (f) said [pins] *pivot means* on the container pivotally engaging the projected hooks as the carriage is lowered, and the container upon continued lowering movement of the carriage and its lift fingers, tilting [forwardly] *downwardly*, from a level position around said hook-engaged pins as a fulcrum.

2. In a forklift truck according to claim 1 [the] *a second* lower pair of hook-provided arms [being] located adjacent to the lower end of the mast, and the forward part of the container, when *said pivot means on the container is pivotally engaged by said second lower pair of hook-provided arms and said container is* forwardly tilted, being directed to scoop material on the surface along which the truck is movable to collect said material in the container.

3. In a forklift truck according to claim 2, the carriage, upon being raised, bringing its lift forks into reengagement with the container to restore the same to the level position thereof so the truck may transport the same to a dumping site.

4. In a forklift truck according to claim 1:

(a) a plate secured to said [mast] *extension frame* and mounting each of said hook-provided arm, (b) said plates having forwardly directed edges in each of which a recess is formed, and (c) spring means to retract the hook-provided means to confine the pivot [pin] *means* of the container between the hooks and the mentioned recesses.

5. In a forklift truck having a vertical mast that constitutes a guide for vertical movement of a slide mounting a carriage provided with forwardly directed lift forks:

(a) a vertically extensible upper end portion on said vertical mast, (b) [two] *a* pair [s] of [vertically] *laterally* spaced [manually actuated] hook-provided arms carried by said [mast, the upper pair of manually actuated hook-provided arms being carried by said] extensible upper end *portion* [and the lower pair of manually actuated hook-provided arms being carried by said mast], the arms of [each] *said* pair being located on opposite sides of the mast, the arms being movable between retracted positions with the hooks thereof rearwardly clear of the forward face of said carriage, and projected positions with the hooks forward of said carriage face, (c) means on said vertically extensible upper end [in] *portion movable into* the path of *the* vertical extension movement of said [mast] slide to engage and extend the [mast end] *vertically extensible upper end portion* to [increase the vertical spacing of the two pairs of hook-provided arms,] *preselect the elevation of the dumping position,*

(d) means to lock the [extensible ends] *vertically extensible upper end portion* of the mast in [both] its [lower and extended] *preselected* positions, and (e) a container having aligned pivot [pins] *means* at the lower rear [corners] *edge* adapted to be supported on the liftforks of the carriage with said pivot [pins] *means* in the path of the projected hooks [of either pair thereof, selectively,] during lowering movement of the carriage and the container supported on the lift forks thereof, (f) said [pins] *pivot means* on the container pivotally engaging the projected hooks as the carriage is lowered, and the container upon continued lowering movement of the carriage and its lift [fingers] *forks*, tilting [forwardly] *downwardly* from a level position around said hook-engaged [pins] *pivot means* as a fulcrum.

6. In a forklift truck according to claim 5, the mentioned means to extend the mast end including a normally retracted member and means to move said member into the path of upward movement of the mast slide to be engaged and raised thereby, raising the mast extension.

References Cited

The following references, cited by the Examiner, are of record in the patented file of this patent or the original patent.

UNITED STATES PATENTS

| | | | |
|---|---|---|---|
| 1,768,149 | 6/1930 | Remde | 214—317X |
| 2,289,024 | 7/1942 | Lambert | 214—317 |
| 2,705,571 | 4/1955 | Streb et al. | 214—313X |
| 3,129,833 | 4/1964 | Townsend | 214—620X |
| 2,273,359 | 2/1947 | Johnson | 214—317 |
| 2,923,424 | 2/1960 | Herpich et al. | 214—317 |

HUGO O. SCHULZ, Primary Examiner